(12) United States Patent
Dilliner

(10) Patent No.: US 7,402,929 B1
(45) Date of Patent: Jul. 22, 2008

(54) MAGNETIC MOTOR WITH MAGNET ASSEMBLIES

(76) Inventor: Monte Dilliner, 208 Brown St., Lineville, IA (US) 50147

( * ) Notice: Subject to any disclaimer, the term of this patent is extended or adjusted under 35 U.S.C. 154(b) by 245 days.

(21) Appl. No.: 11/286,715

(22) Filed: Nov. 23, 2005

(51) Int. Cl.
*H02K 21/00* (2006.01)
(52) U.S. Cl. ............. 310/152; 310/154.06; 310/154.34; 310/154.43; 310/191; 310/209; 310/156.36
(58) Field of Classification Search ................. 310/152, 310/80, 156.43, 181, 68 R, 68 E, 113, 103, 310/68 B, 191, 209, 156.36, 156.37, 156.45, 310/156.12, 156.13, 156.26, 154.06, 154.34, 310/154.43
See application file for complete search history.

(56) References Cited

U.S. PATENT DOCUMENTS

| | | | | |
|---|---|---|---|---|
| 3,256,823 A | * | 6/1966 | Keyes | ........................ 417/44.2 |
| 3,309,988 A | * | 3/1967 | Touchman | ............... 101/93.22 |
| 3,670,189 A | * | 6/1972 | Monroe | ........................ 310/46 |
| 3,967,146 A | * | 6/1976 | Howard | ........................ 310/80 |
| 4,163,914 A | * | 8/1979 | Keyes | ........................ 310/103 |
| 4,517,477 A | | 5/1985 | Pankratz | |
| 5,291,104 A | * | 3/1994 | Okada et al. | ................. 318/254 |
| 5,365,134 A | | 11/1994 | Mason et al. | |
| 5,627,419 A | | 5/1997 | Miller | |
| 5,633,546 A | * | 5/1997 | Horst | ........................ 310/68 B |
| 5,834,872 A | * | 11/1998 | Lamb | ........................ 310/103 |
| 6,005,317 A | | 12/1999 | Lamb | |
| 6,121,705 A | * | 9/2000 | Hoong | ........................ 310/113 |
| 6,199,391 B1 | * | 3/2001 | Link et al. | ..................... 62/133 |
| 6,414,408 B1 | * | 7/2002 | Erdman et al. | ............ 310/68 R |
| 6,433,452 B1 | * | 8/2002 | Graham | ....................... 310/152 |
| 6,522,130 B1 | * | 2/2003 | Lutz | ........................ 324/207.2 |
| 6,531,799 B1 | * | 3/2003 | Miller | ........................ 310/114 |
| 6,617,746 B1 | * | 9/2003 | Maslov et al. | ................ 310/254 |
| 6,806,610 B2 | | 10/2004 | Dilliner | |
| 2002/0093267 A1 | * | 7/2002 | Harris | ........................ 310/209 |
| 2002/0117924 A1 | * | 8/2002 | Dilliner | ..................... 310/181 |
| 2002/0171305 A1 | * | 11/2002 | Coupart et al. | ......... 310/156.08 |
| 2004/0183387 A1 | * | 9/2004 | Moe | ........................... 310/152 |
| 2004/0189132 A1 | * | 9/2004 | Horst | ........................ 310/209 |
| 2005/0104469 A1 | * | 5/2005 | Zepp et al. | .................. 310/191 |

* cited by examiner

*Primary Examiner*—Darren Schuberg
*Assistant Examiner*—Alex W Mok
(74) *Attorney, Agent, or Firm*—Fulbright & Jaworski L.L.P.

(57) ABSTRACT

A magnetic motor that includes a plurality of rotor magnet assemblies, a plurality of drive magnet assemblies that are laterally moveable with respect to the rotor magnet assemblies, a timing assembly for generating power pulses selectively supplied to the drive magnet assemblies and electromagnetic coils associated with the drive magnet assemblies to receive the power pulses from the timing assembly to momentarily disrupt the magnetic field of such assemblies at selected times.

13 Claims, 9 Drawing Sheets

MAGNETIC MOTOR WITH MAGNET ASSEMBLIES

BACKGROUND OF THE INVENTION

1. Field of the Invention

The present invention is related in general to motors having permanent or electromagnet that provide a driving force and more particularly relates to a magnetic motor having magnet assemblies.

2. Description of the Prior Art

DC magnet motors having an armature supported between magnetic pole pieces are well-known in the art. While such magnetic motors have been utilized in low power applications, such as auxiliary motors, they often lack the necessary force or efficiency for driving larger machinery or assemblies.

One example of a DC magnetic motor assembly is shown in U.S. Pat. No. 5,365,134 that teaches a direct current motor formed by an armature interposed between opposing magnetizable members magnetized by permanent magnets or coils extending between the members. The magnets or coils are energized by a DC source. Elongated members are disposed normal and connected with the respective magnetized members to form opposing pairs of opposite polarity poles disposed in diametric opposition on the armature.

Another example is disclosed in U.S. Pat. No. 4,517,477 that shows a magnetic motor with a plurality of permanent magnets arranged to have spaced apart alternating opposite poles around a rotor. A stator magnet alternately attracts the first pole and repels the second pole of each sequential permanent magnet to cause rotation. Magnetic means defining a stator alternates between a first phase of attracting the first pole of a given magnet and a second phase of repelling the second pole of the given magnet. Timing means detect the position of the magnet and signal magnetic means for alternating between the first and second phases. The magnets may include spaced apart permanent magnets each having the same pole directed towards the rotor. A solenoid responsive to the timing means selectively and alternatively positions the stator magnets in close proximity to the rotor for alternatively attracting or repelling the rotor magnets. The phases are accomplished by a single pole of a single permanent magnet having a field which is periodically nullified by the electric means response to the timing means.

Yet another example of a magnetic motor assembly is taught by U.S. Pat. No. 5,627,419 that involves a flywheel system having permanent magnets disposed on a flywheel rotating about a shaft that includes a stator. The stator is movable with respect to the shaft and the flywheel to produce an electromagnetic field that provides an electromagnetic engagement of the stator and the rotor/flywheel to provide a driving force.

In addition to the foregoing prior art magnetic motors, U.S. Pat. No. 6,005,317 discloses an adjustable magnet coupler that has a group of magnet rotors with permanent magnets separated by air gaps from nonferrous conductor elements presented by a group of conductor rotors. The air gaps are adjusted by axial movement of one of the groups relative to the other to vary the slip of the coupler and control the load speed under varying load conditions. Although such patent does not specifically describe a magnetic motor, it provides the teaching of the use of permanent magnets in connection with conductor rotors.

Yet another magnetic motor is disclosed in U.S. Pat. No. 6,806,610 B2 that provides a motor with a plurality of rotor magnets positioned along a rotor that is mounted on a shaft. A plurality of drive magnets are movably positioned generally adjacent to the rotor magnets to cause rotation of the rotor. Relative motion of the drive magnets into and out of juxtaposed positions with the rotor magnets controls relative torque of the shaft and the drive magnets are electrically pulsed through a timing assembly that provides power pulses that are selectively supplied to each rotor magnet. Brush slip rings are utilized for transferring electrical power from an alternator to the rotor magnet and the interior of the magnetic motor assembly is cooled by the use of oil.

The present invention is designed as an improvement over the above described prior art and is adapted to provide a high power, efficient, relatively simplified magnetic motor that can be utilized for a wide variety of low power or high power applications.

SUMMARY OF THE INVENTION

The present invention provides a magnetic motor having a plurality of rotor magnet assemblies positioned on a rotor attached to a main shaft, a plurality of drive magnet assemblies positioned on a drive magnet hub and located generally proximate to said rotor and a timing assembly for generating power pulses selectively supplied to said drive magnet assemblies. Each of the drive magnet and rotor magnet assemblies is formed of at least two stacked permanent magnets separated by a nonmagnetic material to provide a magnetic field, and each of the drive magnet assemblies has an associated electromagnetic coil that receives the power pulses from said timing assembly to momentarily disrupt the magnetic field of said associated assembly.

Preferably, the timing assembly is comprised of a first plate that is attached to said main shaft and has a plurality of magnetic particles associated with it arranged in a circular pattern. A second plate is proximate to said first plate and is fixed in position with respect to such first plate. Such second plate has a plurality of magnetic sensors arranged in a similar fashion to that of the magnetic particles of the first plate so that as the main shaft rotates, the magnetic sensors detect the magnetic particles on said first plate and provide timing signals to said drive magnet assemblies in response.

The foregoing and other advantages of the present invention will appear from the following description. In the description, reference is made to the accompanying drawings which form a part hereof, and which are shown by illustration and not of limitation a specific form in which the invention may be embodied. Such embodiment does not represent the full scope of the invention, but rather the invention may be employed in a variety of other embodiments and reference should be made to the claims herein for interpreting the breadth of the invention.

BRIEF DESCRIPTION OF THE DRAWINGS

The invention will now be described by way of example with reference to the accompanying figures of which.

DETAILED DESCRIPTION OF THE PREFERRED EMBODIMENT

Figure 1:
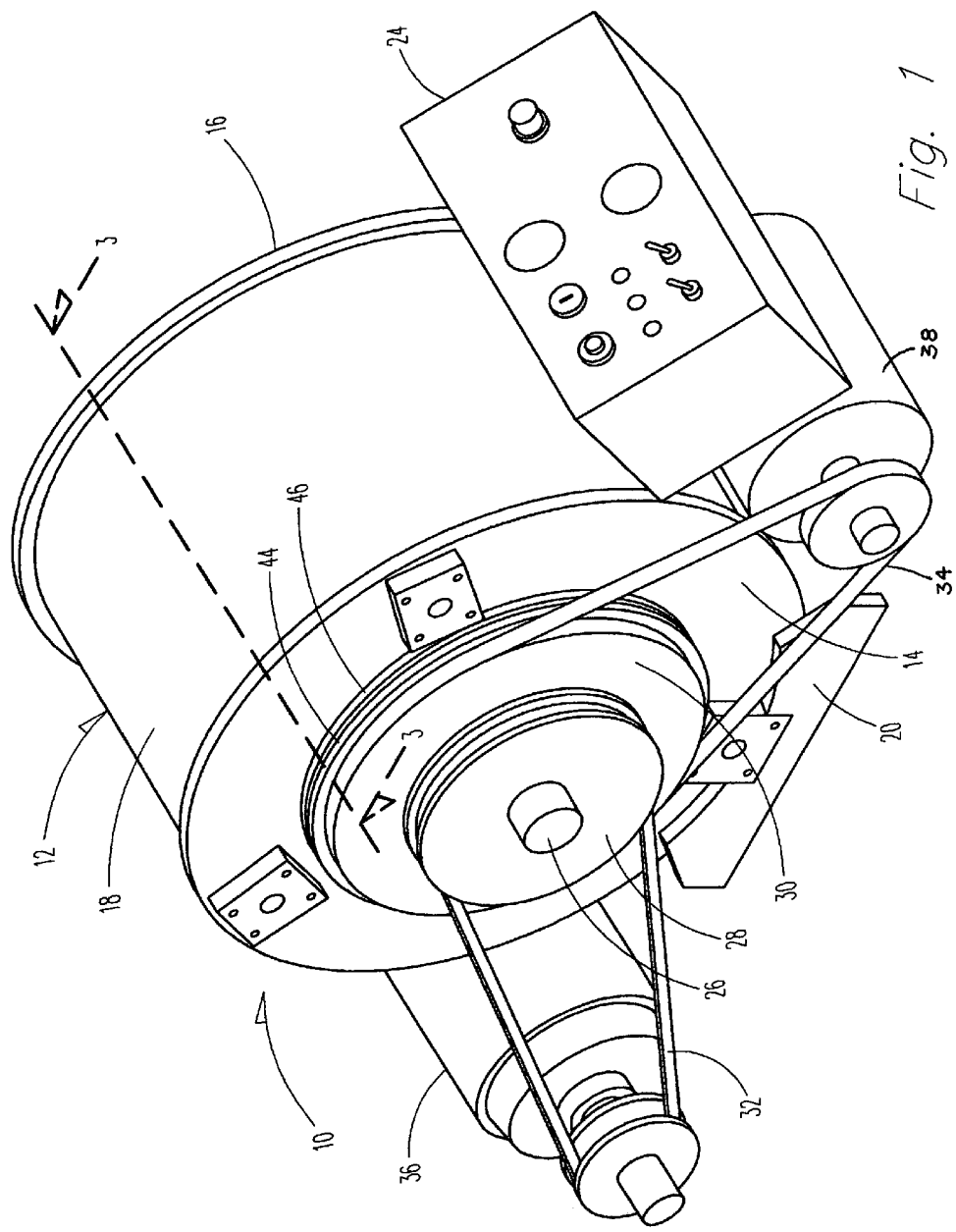
FIG. 1 is a front perspective view of a preferred embodiment of the magnetic motor according to the present invention.
Figure 2:
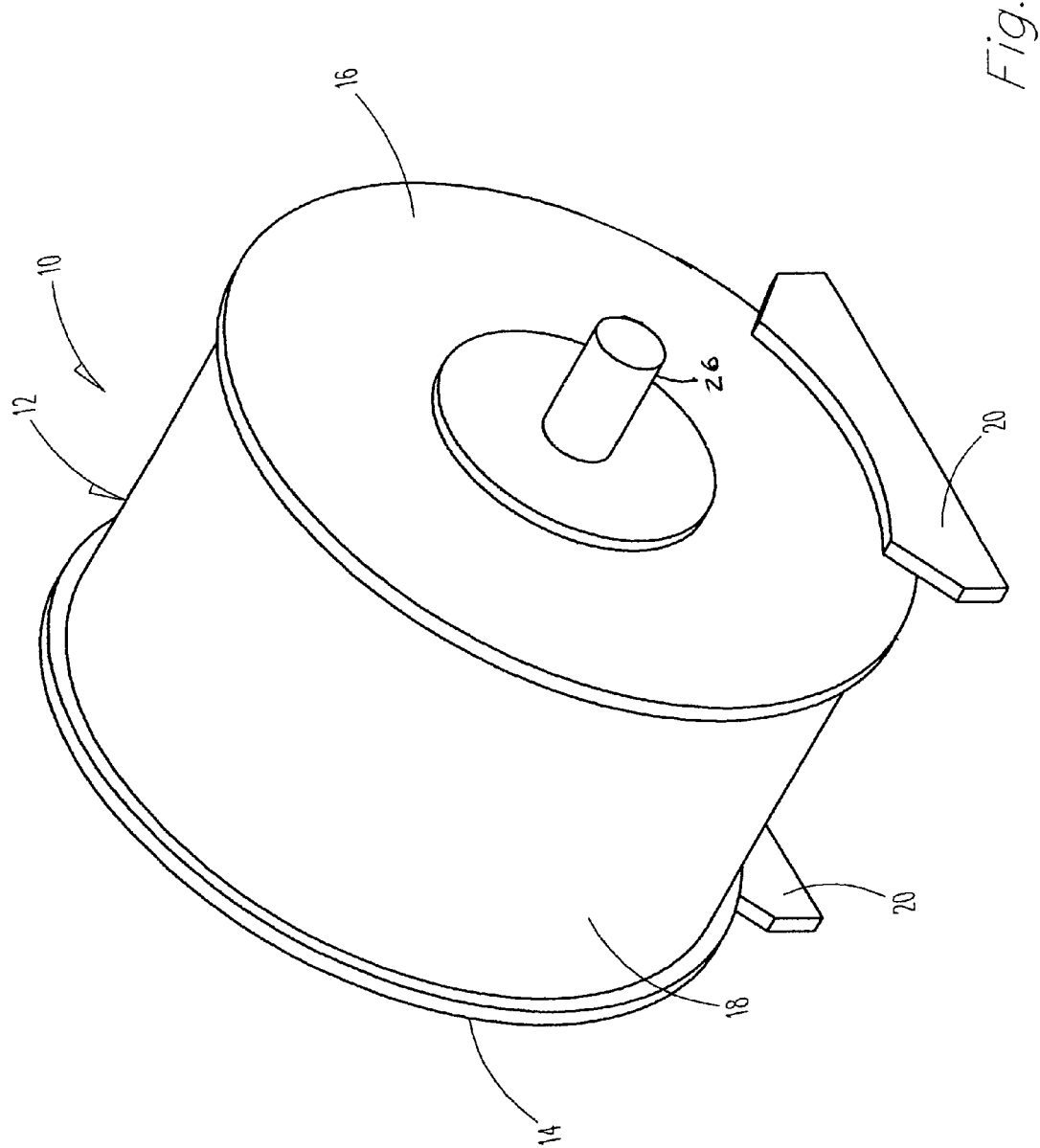
FIG. 2 is a rear perspective view of the housing of the magnetic motor of FIG. 1.

Referring now to the drawings and with reference first to FIGS. 1 and 2, a preferred embodiment of the magnetic motor of the present invention is shown generally at 10. The main components of the motor 10 are disposed within an outer cylindrically shaped housing 12 having a front plate 14, a rear plate 16 and a side housing 18. Front and rear motor mounts 20 extend from the front and rear plates 14 and 16 respectively at desired locations, but can be moved or interchanged for various mounting arrangements. A control panel 24 is shown along a periphery of the side housing 18.

A main shaft 26 extends out of the front plate 14 and through the outer housing 12 as will be described in further detail below. Pulleys 28 and 30 are mounted on the main shaft 26 outside of the front plate 14 and are associated with belts 32 and 34 respectively. The belt 32 connects with an alternator 36 to provide drive power therefore and the belt 34 connects with a starter motor 38 for initiating the operation of the motor 10. As will be described in further detail below, once the operation of the motor 10 is initiated, the starter motor 38 is no longer utilized as the alternator 36 provides sufficient electrical charge to the motor 10 thereafter.

Figure 8:
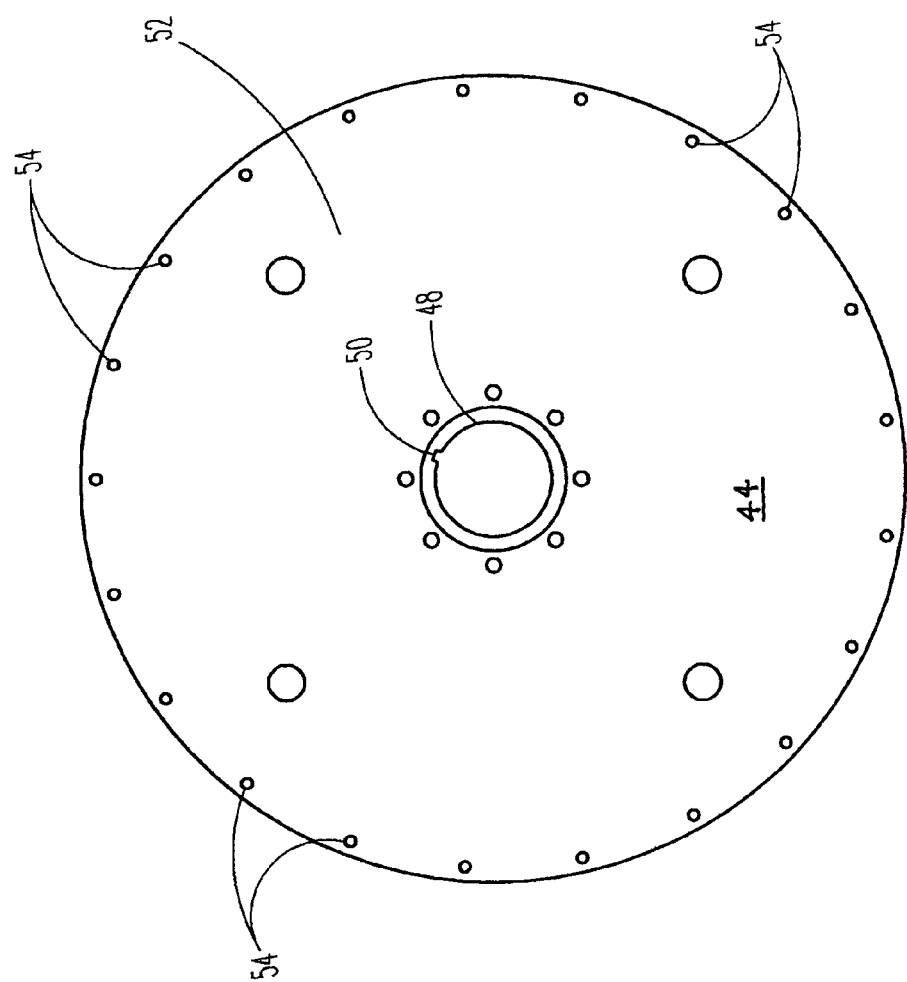
FIG. 8 is a magnetic particle plate that forms a portion of the timing assembly included in the motor of FIG. 1.

Also mounted outside the front plate 14, as part of a timing assembly 42, are first and second timing assembly plates 44 and 46 respectively. Referring now to FIG. 8, the first timing assembly plate 44 is illustrated and includes a central opening 48 that has a key way 50 for engaging a key on the main shaft 26 to rotationally lock the shaft 26 and the first plate 44 together in rotation with one another. The first plate 44 has an inner face 52 with a peripheral portion in which a plurality of magnetic particles 54 are arranged in a circular fashion.

Figure 7:
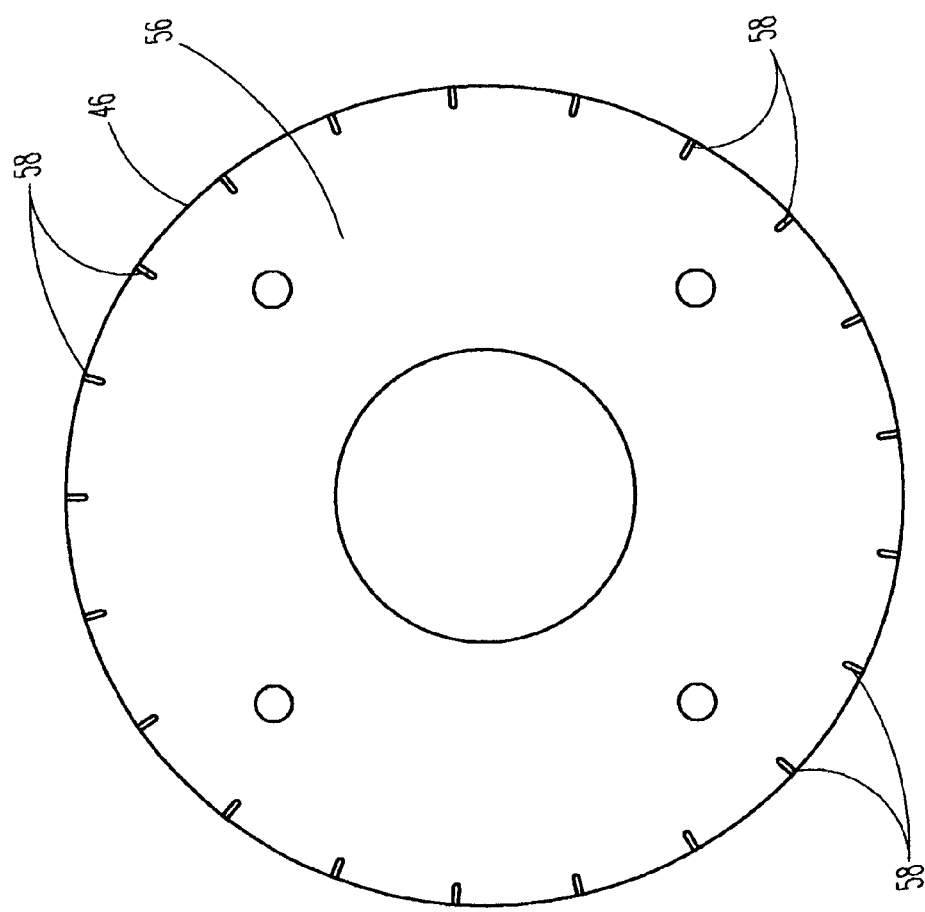
FIG. 7 is a side view of a sensor plate that forms part of a timing assembly included in the motor of FIG. 1.

The first timing assembly plate 44 is mounted on the main shaft 26 adjacent the second timing assembly plate 46, which as shown in FIG. 7, is generally similar in size to the plate 44. However, rather than rotating with the shaft 26, the second plate 46 is mounted in a fixed position on the front plate 14. The second plate 46 also has an outer face 56 with a peripheral portion in which a plurality of magnetic sensors 58 are arranged in a circular fashion corresponding to the arrangement of the magnetic particles 54 in the first plate 44. Thus, as the first plate 44 rotates in conjunction with the main shaft 26, the sensors 58 in the second plate 46 detect the magnetic particles 54 for a purpose to be described below. The sensors 58 can be of a variety of different configurations, but it has been found that surface mount Hall effect sensors are particularly well adapted for use as the sensors 58.

Figure 3:
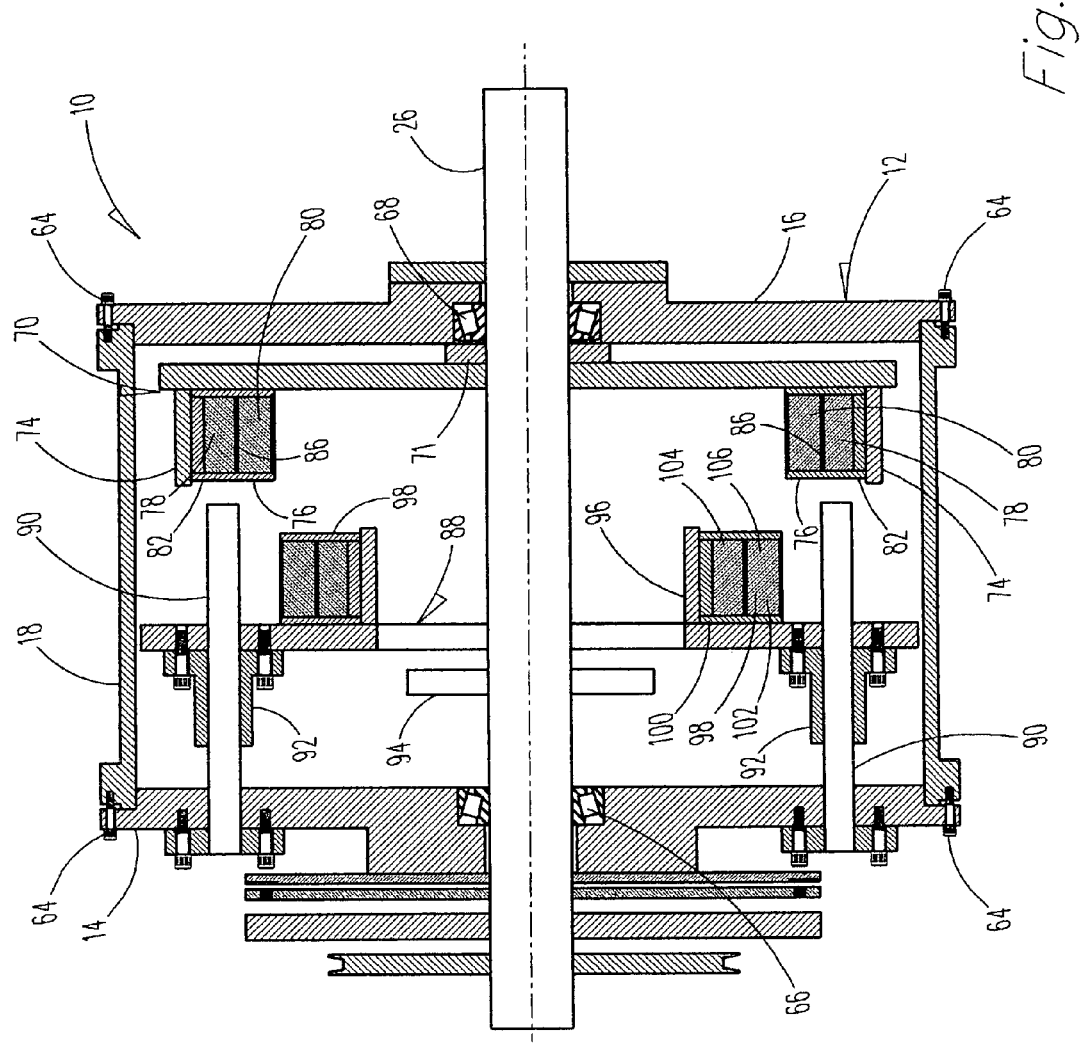
FIG. 3 is a cross-sectional view taken along the line 3-3 of FIG. 1.

Referring now to FIG. 3, the magnetic motor 10 is shown in cross-section for the purpose of illustrating the interior parts thereof. The front plate 14 and rear plate 16 are fixed to the housing 12 by housing bolts 64. The main shaft 26 extends through the front plate 14 and the rear plate 16 and is supported within the front plate 14 by a front case bearing 66. Similarly, a rear case bearing 68 is provided around the rear end of the main shaft 26 inside the rear plate 16 so that the bearings 66 and 68 provide rotational support for the main shaft 26.

Figure 4A:
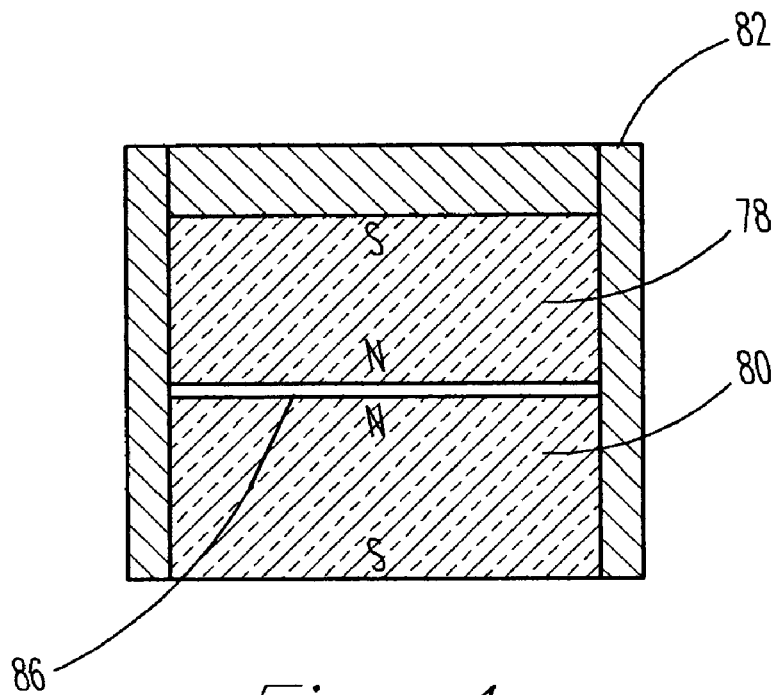
FIG. 4a is a cross-sectional view of a rotor magnet assembly included in the motor of FIG. 1.
Figure 5:
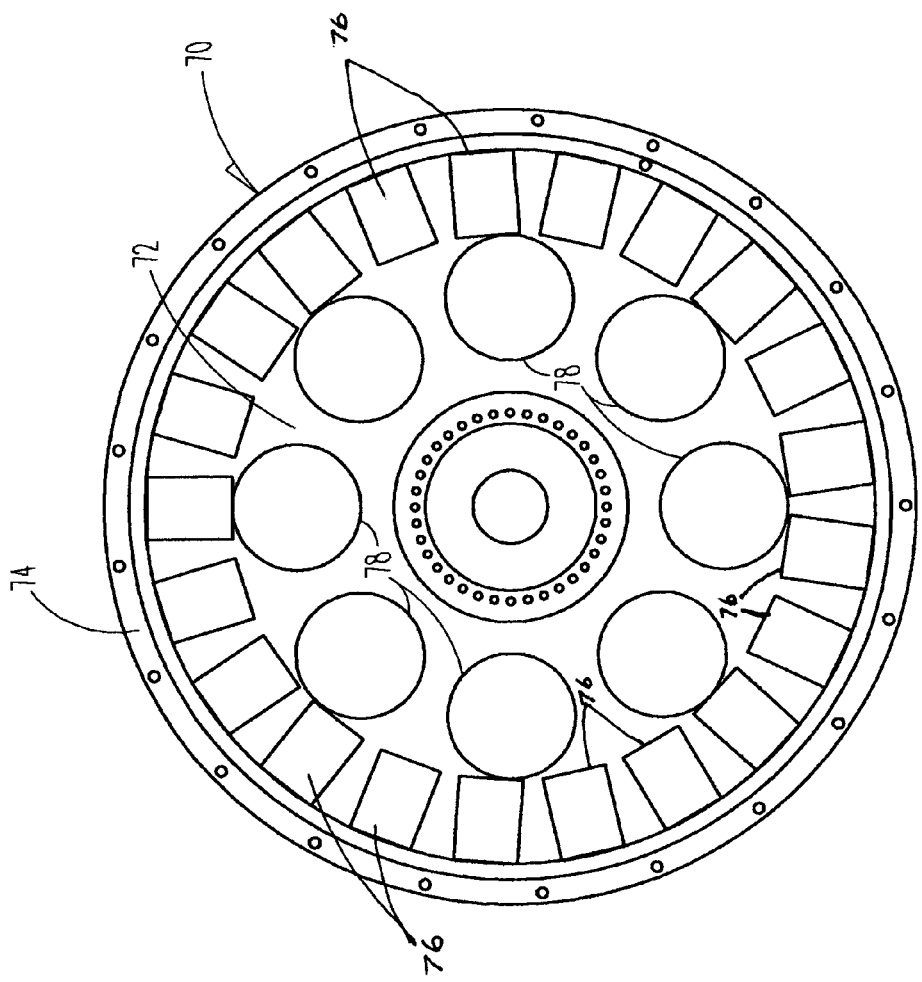
FIG. 5 is a side view of a rotor assembly formed of a rotor and a plurality of rotor magnet assemblies included in the motor of FIG. 1.

A rotor assembly 70 is fixed to the main shaft 26 by means of a mounting plate 71 for rotation therewith. Referring now to both FIGS. 3 and 5, the rotor assembly 70 is generally disk shaped with a central wall 72 having a circularly shaped-ledge 74 along its outer periphery to serve as a foundation for a plurality of spaced apart rotor magnet assemblies 76 that are attached to the ledge 74. Preferably, the central wall 72 of the rotor assembly 70 is reduced in weight by openings 78 in its medial portion. The magnet assemblies 76 are arranged in a spaced apart relationship on the rotor ledge 74 approximately one-quarter to one-half inch apart. To provide an enhanced magnetic force, each of the magnet assemblies 76 includes two permanent magnets 78 and 80, as shown in FIG. 4a, that are located in an aluminum housing 82.

Preferably, the magnets 78 and 80 are neodymium iron boron magnets such as those available from Magnetic Component Engineering to provide a magnet that is mechanically strong and has a high temperature co-efficient so as to be less sensitive to being affected by heat. As further indicated in FIG. 4a, the magnets 78 and 80 have planer surface poles and are arranged in the housing 82 so that two like poles of the magnets 78 and 80 are adjacent to one another. However, the magnets 78 and 80 are not held in contact with one another but instead are spaced apart by nonmagnetic strips 86 that are preferably fiber glass strips so as to be separated approximately 5/16 inches apart.

Figure 6:
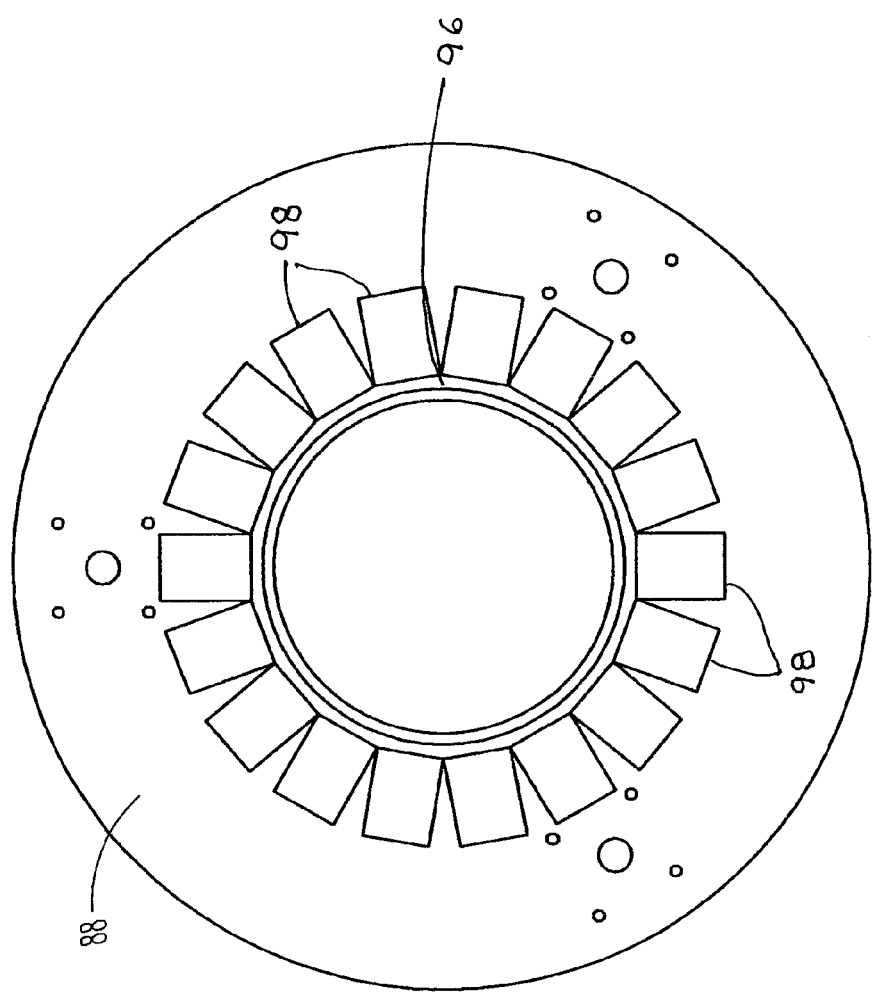
FIG. 6 is a side view of a stator assembly formed of a hub and a plurality of stator magnet assemblies included in the motor of FIG. 1.

Referring now to FIGS. 3 and 6, a stator assembly 88 is supported in the housing 12 by three Thompson bearing shafts 90 that extend inwardly from associated bearing shaft holders 91 mounted on the front plate 14 and are interconnected with the stator assembly 88 through the use of Thompson bearings 92. The stator assembly 88 is therefore journaled on the shafts 90 so as to be movable with respect thereto away from the front plate 14 and toward the rear plate 16 and the rotor assembly 70. Such movement preferably is controlled through the use of a magnetic coil 94 journaled on the main shaft 26.

Figure 4B:
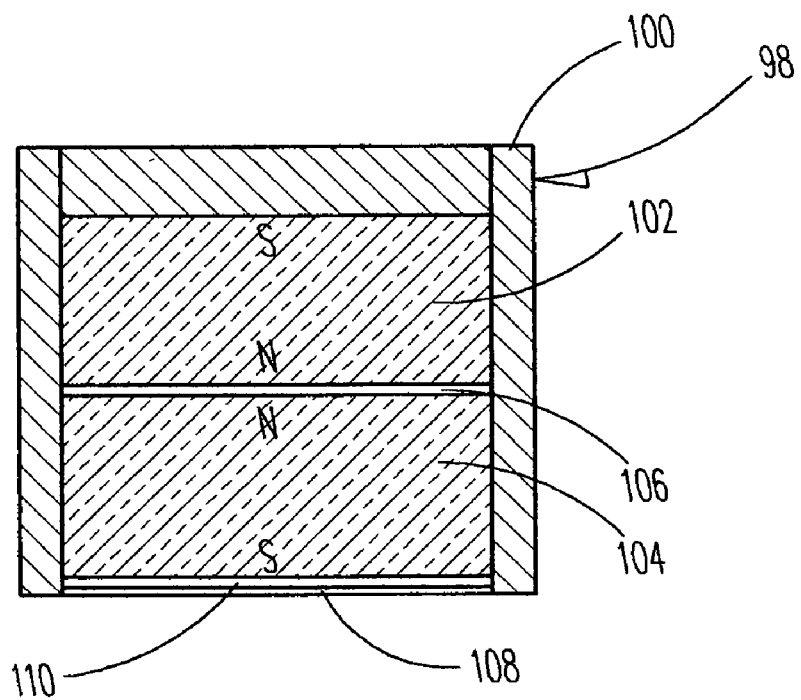
FIG. 4b is a cross-sectional view of a drive magnet assembly included in the motor of FIG. 1.

The stator assembly 88 includes a hub 96 on which a plurality of drive magnet assemblies 98 are mounted. As indicated in FIG. 4b, the drive magnet assemblies 98 are somewhat similar in construction to the rotor magnet assemblies 76 in that they are formed with an aluminum case 100, a pair of permanent magnets 102 and 104 that are spaced apart by fiber glass strips 106 and are arranged with their planer surface poles adjacent one another. However, in addition to such construction, the drive magnet assemblies also include an electromagnetic coil 108 that generally covers the top of the magnet 104 but is separated therefrom by fiber glass strips 110.

Preferably, each of the coils 108 is formed by flat copper foil wire and are driven as a result of timing signals produced by the first and second timing assembly plates 44 and 46 respectively to provide; a magnet with poles aligned opposite to that of the permanent magnets 102 and 104. The purpose of the coils 108 is to counteract the magnetic field of the drive magnet assemblies 98 at selected times and to provide the magnetic force that pulls the rotor magnet assemblies 76 pass a position dead center with the drive magnet assemblies 98. During operation of the motor 10, activation of the coils 108 occurs when the drive magnet assemblies 98 are approaching a position directly in line with the rotor magnet assemblies 76 so that the magnetic fields produced by the drive magnet assemblies 98 are disrupted and the fields of the coils 108 pull the rotor magnet assemblies 76 pass the dead center position.

Although the permanent magnets 102 and 104 are adapted to be less sensitive to high temperatures, to preserve their strength it is preferable to use a blower (not shown) to provide air flow to the drive magnet assemblies. Because of the motion of the rotor assembly 70 such cooling is not required for the rotor magnet assemblies 76.

Figure 9:
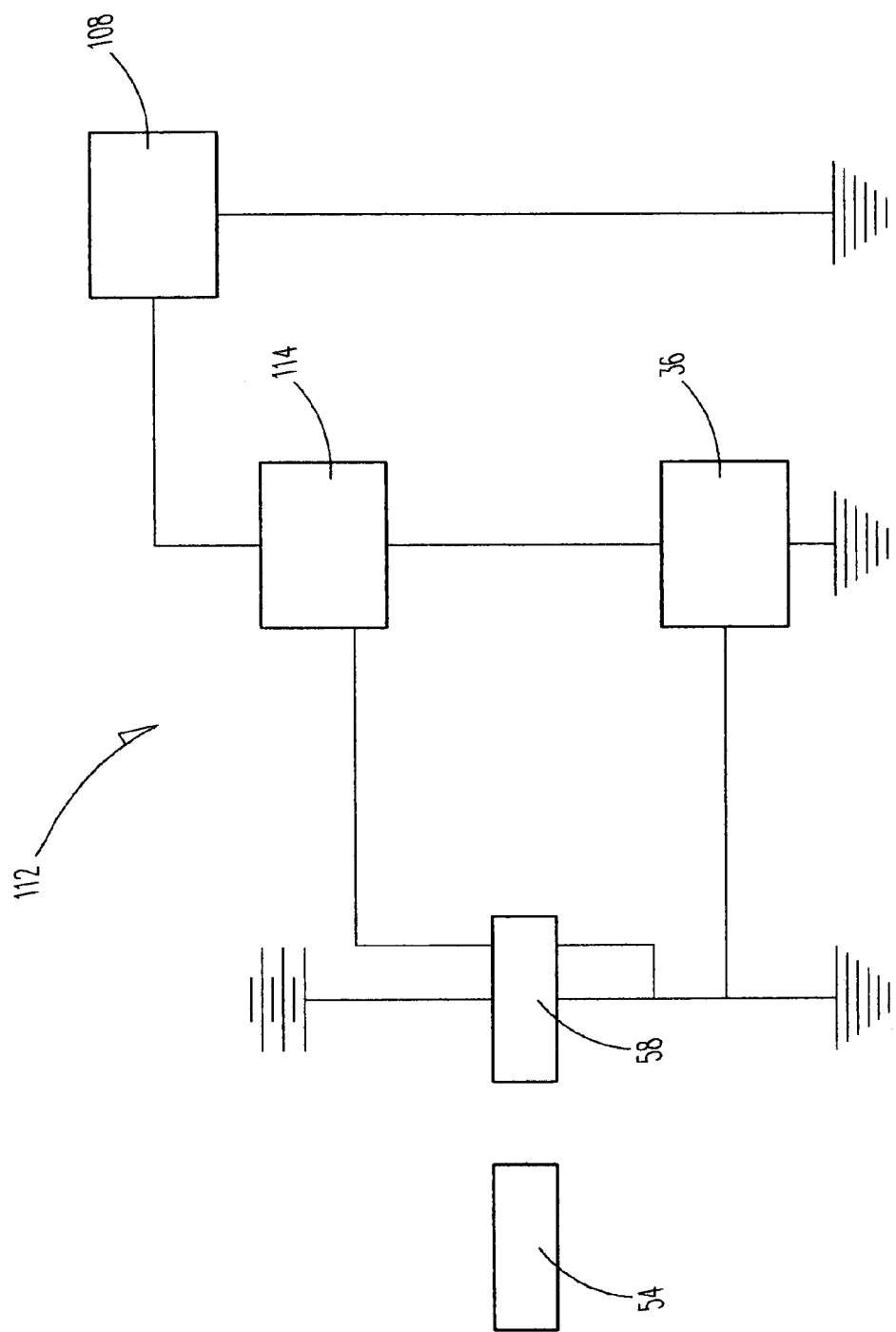
FIG. 9 is a block diagram of a timing circuit that forms a portion of the timing assembly included in the motor of FIG. 1.

In addition to the timing assembly plates 44 and 46, the timing assembly 42 includes an electronic circuit 112, of the type as that shown in the block diagram of FIG. 9. The circuit 112 is designed to receive the timing signals received from the magnetic sensors 58 and produce power pulses to activate the coils 108 of the drive magnet assemblies 98. As indicated by FIG. 9, when the sensors 58 detect the magnetic particles 54, a triggering signal is sent to a high power switch 114 to complete a circuit path from the alternator 36 to the coils 108. Preferably, the switch 114 is a Power Mosfet No. IRFP350 supplied by International Rectifier to provide a combination of fast switching and ruggedized device design that provides low on-resistance and cost effectiveness. The alternator 36 is a standard alternator used to generate a desired DC output upon rotation and therefore will not be described in further detail.

In operation, the starter motor 38 is initiated to begin turning the main shaft 26 and the rotor assembly 70. The electromagnetic coil 94 is then energized to move the stator assembly 88 toward the rotor assembly 70 to enter the vicinity inside the rotor assembly 70 and in juxtaposition thereto in order for the drive magnet assemblies 98 to begin driving the rotation of the rotor assembly 70. Torque and speed of the main shaft 26 is controlled by the position of the stator assembly 88 with respect to the rotor assembly 70 such that greater torque is generated when the rotor magnet assemblies 76 and the drive magnet assemblies 98 are aligned with each other.

The foregoing illustrates some of the possibilities for practicing the invention. Many other embodiments are possible within the scope and spirit of the invention. For example, it should be clear to those skilled in the art that the sizes of the rotor assembly 70 and stator assembly 88 may be reversed so that the assembly 70 has a smaller diameter than that of the assembly 88. Also, it is easily possible to utilize other variations for producing the power pulses provided by the timing assembly 42. It is, therefore, intended that the foregoing description be regarded as illustrative rather than limiting, and that the scope of the invention is given by the appended claims together with their full range of equivalents.

What is claimed is:

1. A magnetic motor comprising:
   (a) plurality of rotor magnet assemblies positioned on a rotor attached to a main shaft;
   (b) a plurality of drive magnet assemblies positioned on a drive magnet hub located generally proximate to said rotor;
   (c) said drive magnet hub being laterally movable to vary the distance between the rotor magnet assemblies and the drive magnet assemblies to increase and decrease the magnetic drive forces applied to the rotor magnet assemblies by the drive magnet assemblies and thereby control the torque and speed of the main shaft;
   (d) a timing assembly for generating power pulses selectively supplied to said drive magnet assemblies;
   (e) each of said drive magnet assemblies and rotor magnet assemblies is formed of at least two stacked permanent magnets separated by a non-magnetic material to provide a magnetic field and
   (f) each of said drive magnet assemblies has an associated electromagnetic coil that receives the power pulses from said timing assembly to momentarily disrupt the magnetic field of said associated assembly at selected times.

2. The magnetic motor as described in claim 1, wherein the stacked magnets in each of said rotor magnet assemblies and drive magnet assembly are separated by strips of said non-magnetic material.

3. The magnetic motor as described in claim 1, wherein said stacked magnets of said rotor magnet assemblies and said drive magnet assemblies are arranged so that the adjacent faces of said magnets are of the same polarity.

4. The magnetic motor as described in claim 1, wherein each of said electromagnetic coils is positioned on its associated drive magnet assembly to be interposed between said associated drive magnet assembly and said rotor magnet assemblies.

5. The magnetic motor as described in claim 1, wherein said timing assembly is comprised of a plate that is attached to said main shaft and has a plurality of magnetic particles associated with it and arranged in a circular pattern thereabout and a second plate proximate to said first plate that is fixed in position with respect to said first plate and has a plurality of magnetic sensors arranged in a similar fashion to the magnetized portions of said first plate so that as the main shaft rotates, the magnetic sensors sense the magnetized portions on said first plate and provide timing signals for the electromagnetic coils of said drive magnet assemblies.

6. The magnetic motor as described in claim 1, wherein said drive magnet hub is laterally movable into and out of the inside of the rotor.

7. The magnetic motor as described in claim 1, wherein the drive magnet hub is laterally movable to receive the rotor.

8. The magnetic motor as described in claim 1, wherein the movement of said drive magnet hub is controlled magnetically to laterally move said hub to vary the distance between the rotor magnet assemblies and the drive magnet assemblies.

9. The magnetic motor as described in claim 1, wherein said permanent magnets of said drive magnet assemblies and rotor magnet assemblies are contained in a housing formed from aluminum.

10. The magnetic motor as described in claim 1, wherein said motor provides cooling to the permanent magnets of said drive magnet assemblies.

11. The magnetic motor as described in claim 1, wherein said plurality of rotor magnet assemblies are spaced apart from one another generally one-quarter to one-half inch.

12. A magnetic motor comprising:
   (a) a plurality of rotor magnet assemblies positioned in a spaced apart circular pattern on a rotor attached to a main shaft;
   (b) a plurality of drive magnet assemblies positioned in a spaced apart circular pattern on a drive magnet hub located generally proximate to said rotor;
   (e) said drive magnet hub being laterally movable to vary the distance between the rotor magnet assemblies and the drive magnet assemblies to increase and decrease the magnetic drive forces applied to the rotor magnet assemblies by the drive magnet assemblies and thereby control the torque and speed of the main shaft;
   (d) a timing assembly for generating power pulses selectively supplied to said drive magnet assemblies and formed of a first plate attached to said main shaft and having a plurality of magnetic particles arranged in a circular pattern, a second plate fixed in position with respect to said first plate and having a plurality of magnetic sensors for detecting the magnetic particles on said first plate and providing timing signals in response thereto, and a timing circuit for receiving said timing signals and providing said power pulses;

(e) each of said drive magnet assemblies and rotor magnet assemblies is formed of at least two stacked permanent magnets separated by a non-magnetic material to provide a magnetic field; and (f) each of said drive magnet assemblies has an associated electromagnetic coil that receives the power pulses from said timing assembly to momentarily disrupt the magnetic field of said associated assembly at selected times.

13. A magnetic motor comprising:

(a) a plurality of spaced apart rotor magnet assemblies positioned on a rotor attached to a main shaft;

(b) a plurality of spaced apart drive magnet assemblies positioned on a drive magnet hub located generally proximate to said rotor;

(c) said drive magnet hub being laterally movable to vary the distance between the rotor magnet assemblies and the drive magnet assemblies to increase and decrease the magnetic drive forces applied to the rotor magnet assemblies by the drive magnet assemblies and thereby control the torque and speed of the main shaft;

(d) a timing assembly for generating power pulses selectively supplied to said drive magnet assemblies and having a magnetic sensing means that is correlated to the rotation of said main shaft and includes circuit means for producing said power pulses in response to such rotation;

(e) each of said drive magnet assemblies and rotor magnet assemblies is formed of at least two stacked permanent magnets separated by a non-magnetic material to provide a magnetic field;

(f) each of said drive magnet assemblies has an associated electromagnetic coil that receives the power pulses from said timing assembly to momentarily disrupt the magnetic field of said associated assembly at selected times; and (g) a starter motor for initiating the operation of said magnetic motor.

\* \* \* \* \*